United States Patent
Shike et al.

(10) Patent No.: US 11,790,465 B2
(45) Date of Patent: Oct. 17, 2023

(54) CONSTRUCTION MANAGEMENT DEVICE, CONSTRUCTION MANAGEMENT SYSTEM, AND CONSTRUCTION MANAGEMENT METHOD

(71) Applicant: Komatsu Ltd., Tokyo (JP)

(72) Inventors: Chikashi Shike, Tokyo (JP); Yuuichi Nemoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/096,159

(22) PCT Filed: Aug. 8, 2017

(86) PCT No.: PCT/JP2017/028770
§ 371 (c)(1),
(2) Date: Oct. 24, 2018

(87) PCT Pub. No.: WO2018/030403
PCT Pub. Date: Feb. 15, 2018

(65) Prior Publication Data
US 2019/0139164 A1    May 9, 2019

(30) Foreign Application Priority Data

Aug. 12, 2016    (JP) .................................. 2016-159032

(51) Int. Cl.
*G06Q 50/08* (2012.01)
*H04W 4/029* (2018.01)
(Continued)

(52) U.S. Cl.
CPC ............. *G06Q 50/08* (2013.01); *G06Q 10/10* (2013.01); *H04W 4/029* (2018.02); *H04W 4/20* (2013.01)

(58) Field of Classification Search
None
See application file for complete search history.

(56) References Cited

U.S. PATENT DOCUMENTS 6,044,312 A  *  3/2000  Sudo ....................... E02F 3/842
                                                340/988
6,134,493 A  * 10/2000  Kaneko ................ G05D 1/0289
                                                340/988

(Continued)

FOREIGN PATENT DOCUMENTS

CN         103729712 A      4/2014
DE    102012212740 A1 *    5/2014    ........... G01C 21/389

(Continued)

OTHER PUBLICATIONS

Sabniveesu, V., Kavuri, A., Kavi, R., Kulathumani, V., Kecojevic, V., & Nimbarte, A. (2015). Use of wireless, adhoc networks for proximity warning and collision avoidance in surface mines. International Journal of Mining, Reclamation and Environment, (Year: 2015).*

(Continued)

*Primary Examiner* — Paul R Fisher
(74) *Attorney, Agent, or Firm* — Locke Lord LLP (57) ABSTRACT

A construction management system includes a position determination unit that determines whether or not a transport vehicle associated with a construction site is located within a notification area associated with the construction site, and an output unit that outputs an indication that the transport vehicle is located within the notification area to a communication terminal associated with the construction site when the position determination unit determines that the transport vehicle is located within the notification area.

14 Claims, 8 Drawing Sheets

(51) Int. Cl.
*G06Q 10/10* (2023.01)
*H04W 4/20* (2018.01)

(56) References Cited

U.S. PATENT DOCUMENTS

| | | | | |
|---|---|---|---|---|
| 6,246,932 | B1* | 6/2001 | Kageyama | G05D 1/0297 |
| | | | | 340/992 |
| 6,486,801 | B1* | 11/2002 | Jones | G08G 1/123 |
| | | | | 340/988 |
| 2003/0211866 | A1 | 11/2003 | Narazaki et al. | |
| 2004/0117361 | A1* | 6/2004 | Greer | G06F 16/2228 |
| 2011/0078074 | A1* | 3/2011 | Lipman | G06Q 99/00 |
| | | | | 705/39 |
| 2013/0165151 | A1* | 6/2013 | Gits | H04W 4/023 |
| | | | | 455/456.3 |
| 2013/0325258 | A1* | 12/2013 | Cooper | B60T 17/228 |
| | | | | 701/36 |
| 2013/0332008 | A1* | 12/2013 | Herman | B64F 1/125 |
| | | | | 701/2 |
| 2016/0056629 | A1* | 2/2016 | Baker | H04W 4/02 |
| | | | | 700/276 |
| 2016/0225106 | A1 | 8/2016 | Shike | |

FOREIGN PATENT DOCUMENTS

| | | | |
|---|---|---|---|
| JP | 2002-324295 A | 11/2002 | |
| JP | 2003296402 A | 10/2003 | |
| JP | 2003-324777 A | 11/2003 | |
| JP | 2005-135259 A | 5/2005 | |
| JP | 2008-071008 A | 3/2008 | |
| JP | 2008-210087 A | 9/2008 | |
| JP | 2010-072696 A | 4/2010 | |
| JP | 2010-073031 A | 4/2010 | |
| JP | 2016-018341 A | 2/2016 | |
| JP | 2016-057882 A | 4/2016 | |
| WO | WO2007106875 A2 * | 9/2007 | G07C 9/00 |

OTHER PUBLICATIONS

Sugiura, H., et al. "Autonomous dump trucks system for transporting and positioning heavy-duty materials in heavy construction sites." Proc. 10th Int. Symp. Automat. Robot. Constr. 1993. (Year: 1993).*

N. Pradhananga and J. Teizer, "GPS-based framework towards more realistic and real-time construction equipment operation simulation," Proceedings of the 2012 Winter Simulation Conference (WSC), 2012, pp. 1-12, doi:10.1109/WSC.2012.6465159. (Year: 2012).*

A. Goel and V. Gruhn, "A Fleet Monitoring System for Advanced Tracking of Commercial Vehicles," 2006 IEEE International Conference on Systems, Man and Cybernetics, 2006, pp. 2517-2522, doi: 10.1109/ICSMC.2006.385242. (Year: 2006).*

Wenyang Ji, Lingjun Tang, Dedi Li, Wenming Yang, Qingmin Liao, Video-based construction vehicles detection and its application in intelligent monitoring system, CAAI Transactions on Intelligence Technology, vol. 1, Issue 2, 2016, pp. 162-172, (Year: 2016).*

Lingguang Song, Neil N. Eldin, Adaptive real-time tracking and simulation of heavy construction operations for look-ahead scheduling, Automation in Construction, vol. 27, 2012, pp. 32-39, ISSN 0926-5805, https://doi.org/10.1016/j.autcon.2012.05.007. (Year: 2012).*

VasMap, [online], Akasakatec. Inc., Jun. 2013, p. 1-2, [search on Jan. 14, 2020], Internet <URL, https://www.survek.co.jp/news/image/vasmap.pdf> and a partial English translation thereof, (cited in the Jan. 21, 2020 Office Action Issued for JP2016-159032).

* cited by examiner

CONSTRUCTION MANAGEMENT DEVICE, CONSTRUCTION MANAGEMENT SYSTEM, AND CONSTRUCTION MANAGEMENT METHOD

TECHNICAL FIELD

The present invention relates to a construction management device, a construction management system, and a construction management method.

Priority is claimed on Japanese Patent Application No. 2016-159032, filed Aug. 12, 2016, the content of which is incorporated herein by reference.

BACKGROUND ART

Patent Literature 1 describes collecting operation data of a work machine from a wireless terminal of the work machine that has entered a communication area of a base station device installed at a predetermined place.

CITATION LIST

Patent Literature

[Patent Literature 1] Japanese Unexamined Patent Application, First Publication No. 2003-324777

SUMMARY OF INVENTION

Technical Problem

At a construction site, a work machine that performs embankment or excavation (for example, a hydraulic excavator, a bulldozer, or a wheel loader) and a transport vehicle (for example, a dump truck) that transports earth and sand between an earth and sand loading site and an earth and sand unloading site at the construction site operate. The work machine operating at the earth and sand loading site loads the earth and sand excavated at the earth and sand loading site onto the transport vehicle. The work machine operating at the earth and sand unloading site arranges the earth and sand transported by the transport vehicle or uses the earth and sand for embankment.

However, since an operator of the work machine cannot recognize a timing at which the transport vehicle arrives at the earth and sand loading site or the earth and sand unloading site, the operator cannot obtain a timing at which preparation for loading or unloading the earth and sand is to be performed.

An object of aspects of the present invention is to provide a construction management system and a construction management method capable of notifying the work machine that the transport vehicle has approached a predetermined place at the construction site.

Solution to Problem

According to a first aspect of the present invention, a construction management device includes a position information acquisition unit that acquires position information from a communication terminal included in a transport vehicle; a notification area-specifying unit that specifies a notification area at a construction site; a position determination unit that determines whether or not the transport vehicle is located within the notification area; and an output unit that outputs a determination result to a communication terminal included in a work machine or a communication terminal used by a manager when the position determination unit determines that the transport vehicle is located within the notification area.

According to a second aspect of the present invention, the construction management device according to the first aspect further includes a ticket issuance unit that issues a ticket associated with the construction site, and the ticket issuance unit issues a ticket for a work machine which is a ticket acquired by a communication terminal included in the work machine or a ticket for a manager which is a ticket acquired by a communication terminal used by the manager, and when it is determined that the transport vehicle is located within the notification area, the output unit outputs an indication that the transport vehicle is located within the notification area to the communication terminal that has acquired the ticket for a work machine or the ticket for a manager.

According to a third aspect of the present invention, the construction management device includes a site information storage unit that stores a work place at a construction site; a change reception unit that receives an input of a change in the work place at the construction site; and a change notification output unit that outputs the change in the work place to a communication terminal included in the transport vehicle upon receiving the input of the change in the work place.

According to a fourth aspect of the present invention, a construction management system includes a work machine; a first communication terminal included in the work machine; a transport vehicle; a second communication terminal included in the transport vehicle; a position information acquisition unit that acquires position information of the second communication terminal; a notification area-specifying unit that specifies a notification area at a construction site; a position determination unit that determines whether or not the transport vehicle is located within the notification area; and an output unit that outputs a determination result to the first communication terminal when the position determination unit determines that the transport vehicle is located within the notification area.

According to a fifth aspect of the present invention, a construction management system includes a work machine; a first communication terminal included in the work machine; a transport vehicle; a second communication terminal included in the transport vehicle; a site information storage unit that stores a work place at a construction site; a change reception unit that receives an input of a change in work place from the first communication terminal; and a change notification output unit that outputs the change in the work place to the second communication terminal upon receiving the input of the change in the work place.

According to a sixth aspect of the present invention, a construction management method includes acquiring position information from a communication terminal included in a transport vehicle; specifying a notification area at a construction site; determining whether or not the transport vehicle is located within the notification area; and notifying a communication terminal included in a work machine or a communication terminal used by a manager of a determination result when a result in which the transport vehicle is located within the notification area is indicated in the step of determining.

Advantageous Effects of Invention

According to at least one of the above aspects, a construction management system and a construction management method capable of notifying a work machine that a transport vehicle has approached a predetermined place at the construction site are provided.

DESCRIPTION OF EMBODIMENTS

First Embodiment

<<Construction Management System>>

Figure 1:
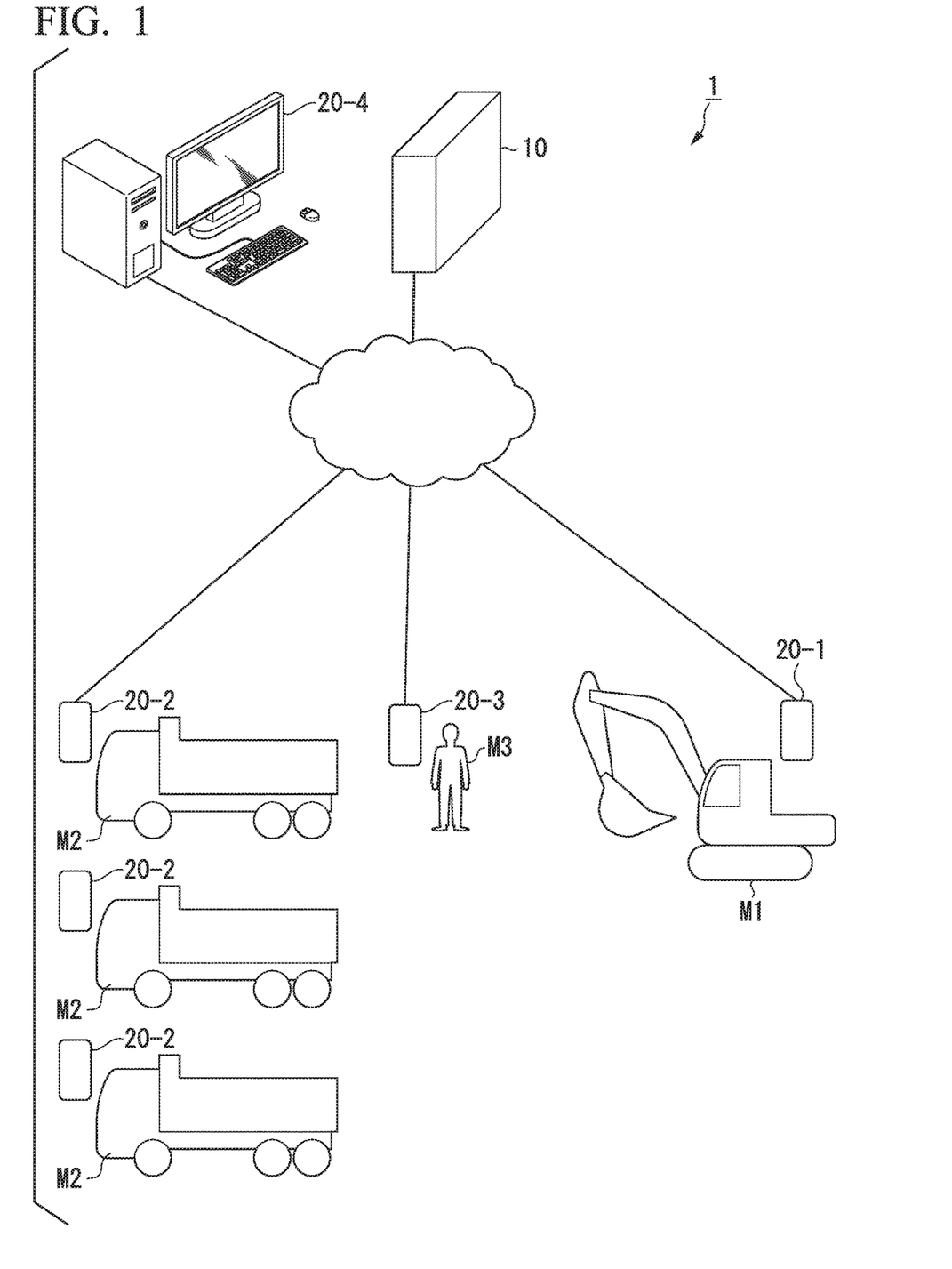
FIG. 1 is a schematic diagram illustrating a configuration of a construction management system according to a first embodiment.

FIG. 1 is a schematic diagram illustrating a configuration of a construction management system according to a first embodiment.

The construction management system 1 manages a work machine M1 and a transport vehicle M2 present at a construction site. At the construction site, there are at least one work machine M1 and a plurality of transport vehicles M2 working in cooperation with the work machine M1. It should be noted that, in the construction site related to other embodiments, there may be only one transport vehicle M2. The construction site may include one area or may include a plurality of separate areas.

The construction management system 1 includes a plurality of communication terminals 20 and a server device 10. The plurality of communication terminals 20 are included in the work machine M1 or the transport vehicle M2 that is a management target of the construction management system 1. The communication terminal 20 may be installed inside the work machine M1 or the transport vehicle M2. The communication terminal 20 may be owned or used by an operator of the work machine M1 or the transport vehicle M2. The communication terminal 20 may be owned or used by the manager M3 at the construction site.

As the communication terminal 20, for example, a mobile phone, a smartphone, a portable computer, or an in-vehicle computer can be used. A communication terminal 20-1 included in the work machine M1 may be, for example, a mobile phone, a smartphone, or a portable computer installed in the work machine M1, may be a device owned by an operator of the work machine M1, or may be a device present somewhere in a cab of the work machine M1. The communication terminal 20-2 included in the transport vehicle M2 is interpreted in the same manner. The communication terminal 20 may be a device mounted on the work machine M1 or the transport vehicle M2. The communication terminal 20 may be a personal computer that is used by the manager M3, for example, at an office away from the construction site. Hereinafter, the communication terminal 20 included in the work machine M1 is referred to as the communication terminal 20-1. The communication terminal 20 included in the transport vehicle M2 is referred to as the communication terminal 20-2. The communication terminal 20 owned by the manager M3 is referred to as a communication terminal 20-3. The communication terminal 20 provided in an office is referred to as a communication terminal 20-4.

The work machine M1 is a vehicle that operates at a loading place P1 (an earth and sand loading position or the like) at a certain construction site or at an unloading place P2 (an earth and sand unloading position or the like) to perform embankment work or excavation work. Examples of the work machine M1 include a hydraulic excavator, a bulldozer, and a wheel loader. The transport vehicle M2 is a vehicle that transports the earth and sand between the loading place P1 and the unloading place P2. An example of the transport vehicle M2 is a dump truck. The loading place P1 and the unloading place P2 are examples of a work place.

The construction management system 1 manages the position information of the work machine M1 and the transport vehicle M2 that operate at a plurality of construction sites. Specifically, the construction management system 1 acquires the position information from the communication terminal 20-2 included in the transport vehicle M2, and when the transport vehicle M2 is within the notification range including the loading place P1 or the unloading place P2 at the construction site, the construction management system 1 notifies the communication terminal 20-1 included in the work machine M1 of that fact. Further, the construction management system 1 receives an instruction to change the loading place P1 or the unloading place P2 from the communication terminal 20-1 included in the work machine M1 or the communication terminal 20-3 owned by the manager M3, and notifies the communication terminal 20-2 included in the transport vehicle M2 of the change.

Figure 2:
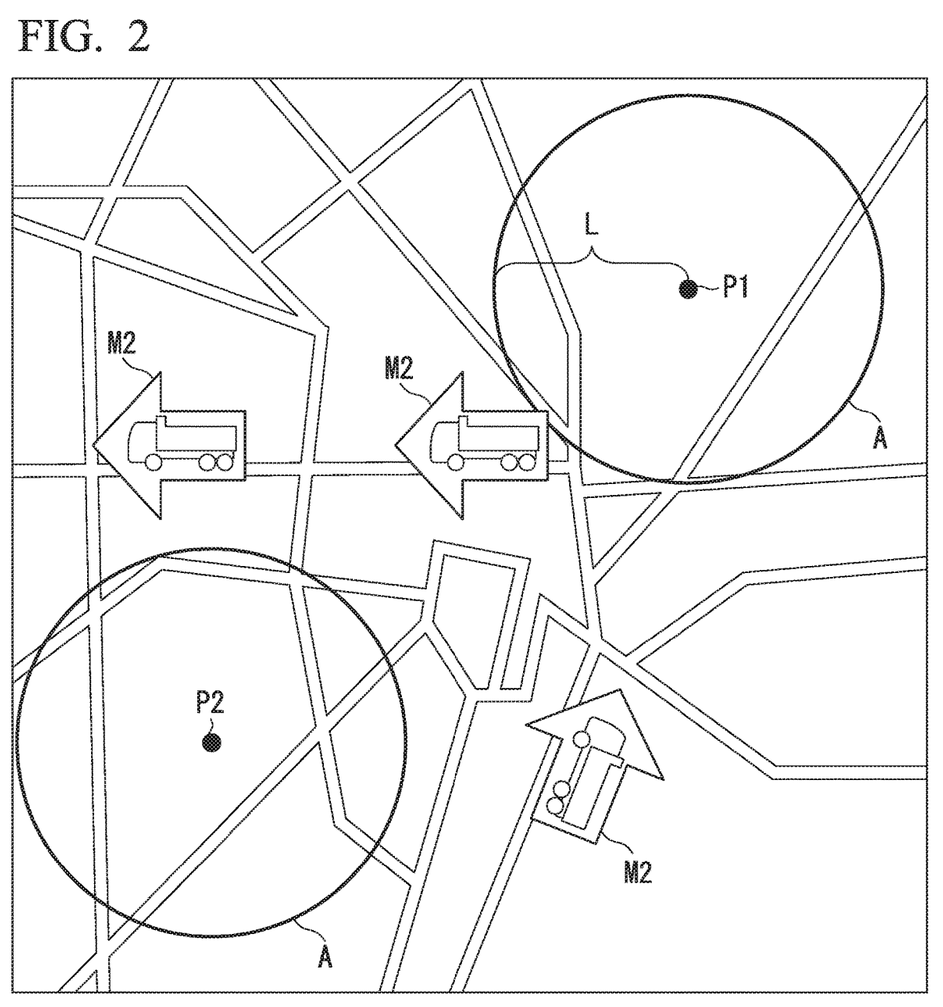
FIG. 2 is a diagram illustrating an example of a notification range in the construction management system according to the first embodiment.

FIG. 2 is a diagram illustrating an example of the notification range in the construction management system according to the first embodiment.

The communication terminal 20 generates a map image as illustrated in FIG. 2 on the basis of the information acquired from the server device 10, and displays a map screen including the map image. As illustrated in FIG. 2, a loading place P1 and an unloading place P2 are set at the construction site. Here, the notification area A may include at least the loading place P1 or the unloading place P2. For example, an area within a predetermined notification distance L from the loading place P1 and the unloading place P2 is set as the notification area A. It should be noted that the communication terminal 20-2 included in the transport vehicle M2 includes a position-specifying unit 216 that detects the position of the subject device. The server device 10 includes an information collection unit 111 that collects the positions detected by each communication terminal 20-2.

When the transport vehicle M2 has entered the notification area A, the server device 10 transmits an approach notification indicating that the transport vehicle M2 has approached the loading place P1 or the unloading place P2 to the communication terminal 20-1 included in the work machine M1 or the communication terminal 20-3 of the manager M3.

<<Server Device>>

Figure 3:
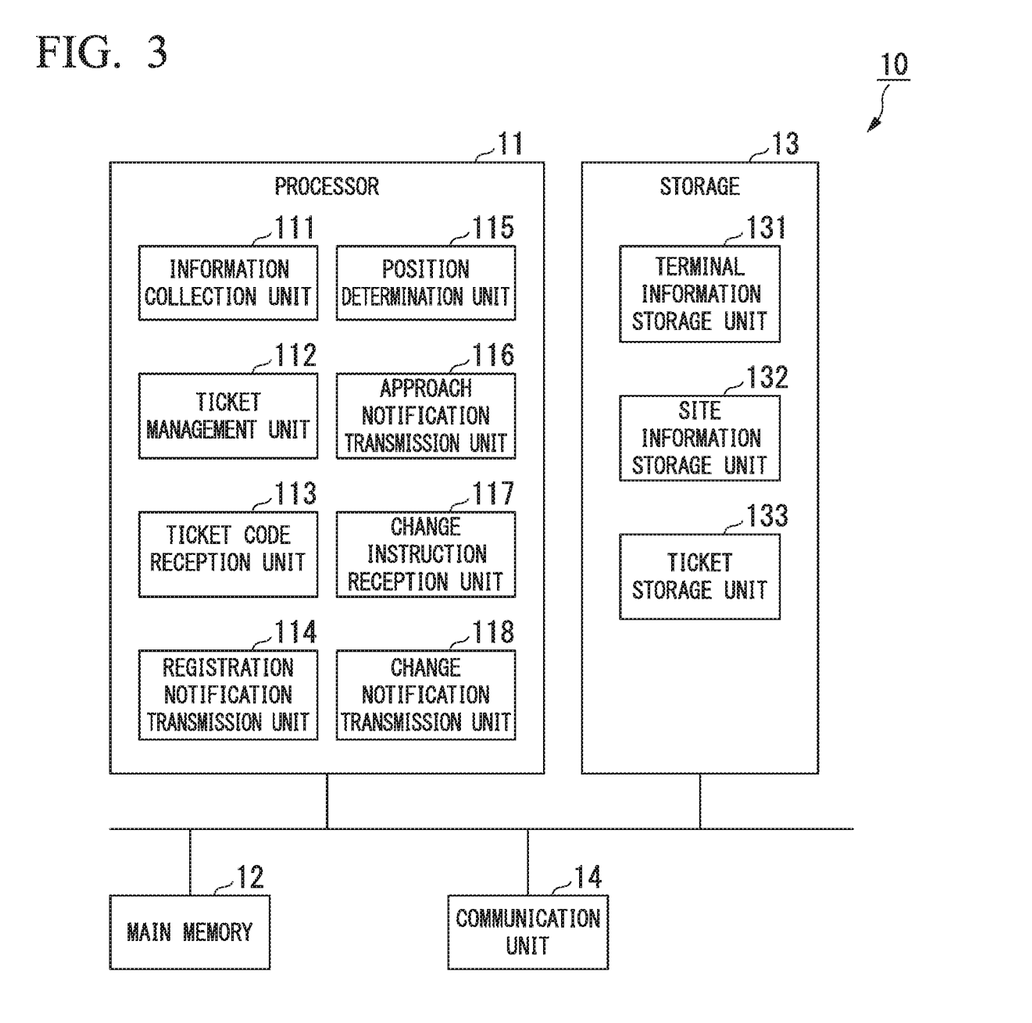
FIG. 3 is a schematic block diagram illustrating a configuration of a server device according to the first embodiment.

FIG. 3 is a schematic block diagram illustrating a configuration of the server device according to the first embodiment.

The server device 10 includes a processor 11, a main memory 12, a storage 13, and a communication unit 14. The storage 13 stores a server-side construction management program. The processor 11 reads the server-side construction management program from the storage 13, develops the server-side construction management program on the main memory 12, and executes a process according to the server-side construction management program. As the communication unit 14, a network card or the like can be used.

The storage 13 has a storage area as a terminal information storage unit 131, a site information storage unit 132, and a ticket storage unit 133.

The terminal information storage unit 131 stores information on the communication terminal 20. Specifically, the terminal information storage unit 131 stores a terminal ID, position information, a user's name, a company name, and other information in association with each other. The terminal ID is information for identifying the communication terminal 20. Any information, such as a contractor-specific ID, a telephone number, an email address, an MAC address of the communication terminal 20, a manufacturing number, or a unique number attached by the server device 10, may be used as the terminal ID as long as the information can specify the communication terminal 20.

The position information is information indicating the position of the communication terminal 20 acquired by a global navigation satellite system (GNSS) or the like. The user's name, the company name, and the like is information on an owner of the communication terminal 20 or a contractor of the construction management system 1, and is information registered in the server device 10 via the communication terminal 20 in advance.

The site information storage unit 132 stores information on the construction site. Specifically, the site information storage unit 132 stores the site ID, the loading place P1, the unloading place P2, and the notification distance L in association with each other. The site ID is information for identifying the construction site. Any information, such as a unique number set for each site, a unique name such as a place name, or an address, may be used as the site ID as long as the information is information capable of specifying the construction site. The notification distance L is a distance for notifying the work machine M1 of the approach of the transport vehicle M2 to the loading place P1 or the unloading place P2. When the transport vehicle M2 is located in an area (notification area A) obtained by connecting positions away by the notification distance L around the loading place P1 or the unloading place P2, the communication terminal 20 of the work machine M1 is notified of the approaching of the transport vehicle M2.

The ticket storage unit 133 stores information on a ticket. The ticket is information used for an arbitrary communication terminal 20 to form any group (for example, a group of the construction site). A ticket code is used to form the group. The ticket code may be, for example, a one-time password, and a four-digit number may be used. The ticket is prepared as a different ticket according to the type of work. That is, the ticket storage unit 133 separately stores at least a ticket for the work machine M1 and a ticket for the transport vehicle M2 for tickets related to the same construction site. For example, the manager M3 can prepare a ticket for each type of work using the communication terminal 20-3. It should be noted that the manager M3 may prepare a ticket for the manager M3.

Specifically, the ticket storage unit 133 stores the ticket code, the site ID, the number of tickets, the type of work, the terminal ID, and the expiration date in association with each other. The ticket code is information for identifying the ticket. By inputting the correct ticket code to the communication terminal 20, the communication terminal 20 is associated with the construction site as a type of work corresponding to the input ticket code.

The number of tickets is a numerical value for setting the number of vehicles required for each type of work. For example, when five transport vehicles M2 are required at the construction site, the manager M3 sets the number of tickets for the transport vehicle M2 to "5."

The type of work is information indicating whether a target of the ticket is the work machine M1, the transport vehicle M2, or the manager M3. A ticket in which the type of work indicates the work machine M1 is an example of the ticket for a work machine. A ticket in which the type of work indicates the transport vehicle M2 is an example of the ticket for a transport vehicle. A ticket in which the type of work indicates the manager M3 is an example of the ticket for a manager. The expiration date is information indicating an expiration date of the work indicated by the ticket. The ticket is set, for example, by the manager M3 at the construction site.

When the ticket code of the ticket for the work machine M1 is input to the communication terminal 20, the server device 10 registers the communication terminal 20 as the communication terminal 20-1 included in the work machine M1. When the ticket code of the ticket for the transport vehicle M2 is input to the communication terminal 20, the server device 10 registers the communication terminal 20 as the communication terminal 20-2 included in the transport vehicle M2. When the ticket code of the ticket for the manager M3 is input to the communication terminal 20, the server device 10 registers the communication terminal 20 as the communication terminal 20-3 owned by the manager M3.

By executing the server-side construction management program, the processor 11 functions as an information collection unit 111, a ticket management unit 112, a ticket code reception unit 113, a registration notification transmission unit 114, a position determination unit 115, an approach notification transmission unit 116, a change instruction reception unit 117, and a change notification transmission unit 118.

The information collection unit 111 collects the terminal ID, the position information, the user's name, the company, and other information from the communication terminal 20, and stores the collected information in the terminal information storage unit 131. The information collection unit 111 is an example of a position information acquisition unit that acquires position information from the transport vehicle M2 associated with the construction site.

The ticket management unit 112 receives an input of information on a construction (a site ID and a type of work) and a ticket issuance request (the number of tickets, and an expiration date) from the user (for example, the manager M3), and issues a ticket having a ticket code. An example of issuance of the ticket may include transmitting a ticket code to the communication terminal 20 via the communication unit 14. The ticket management unit 112 records information on the issued ticket in the ticket storage unit 133. The ticket management unit 112 compares the ticket code received by the ticket code reception unit 113 to be described below with the ticket code already stored in the ticket storage unit 133, and stores the terminal ID to be transmitted together with the ticket code in the ticket storage unit 133 when the ticket codes match. The ticket management unit 112 is an example of a ticket issuance unit.

When the ticket code is input at the communication terminal 20, the ticket code reception unit 113 receives at least the ticket code and the terminal ID from the communication terminal 20 via the communication unit 14. The ticket code reception unit 113 outputs the received ticket code and the received terminal ID to the ticket management unit 112.

The registration notification transmission unit 114 transmits a registration notification indicating whether or not the ticket can be registered to the communication terminal 20 that is a ticket code transmission source via the communication unit 14.

The position determination unit 115 determines whether or not the transport vehicle M2 is located within the notification area A that is an area within the notification distance L from the loading place P1 or the unloading place P2 on the basis of the information stored in the terminal information storage unit 131, the site information storage unit 132, and the ticket storage unit 133.

When the position determination unit 115 determines that a certain transport vehicle M2 is located within the notification area A, the approach notification transmission unit 116 transmits an approach notification indicating that the transport vehicle M2 is located within the notification area A to the communication terminal 20 of the work machine M1 operating at the same site as the transport vehicle M2 and the communication terminal 20 of the manager M3 associated with the site via the communication unit 14. The approach notification transmission unit 116 is an example of an output unit that outputs an indication that the transport vehicle M2 is located within the notification area A to the communication terminal 20.

The change instruction reception unit 117 allows to receive an input of an instruction to change the loading place P1 or the unloading place P2 (work place) from the communication terminal 20 via the communication unit 14. Examples of a method of designating the loading place P1 or the unloading place P2 include a method of designating x and y coordinates in a global coordinate system, a method of designating a latitude and a longitude, and a method of performing designation through tapping of a map on a touch panel. When the change instruction reception unit 117 receives an input of an instruction to change, the change instruction reception unit 117 updates the information stored in the site information storage unit 132 on the basis of the instruction. The change instruction reception unit 117 is an example of a change reception unit that receives an input of change in the work place from the communication terminal 20 of the work machine M1 associated with the construction site.

When the change instruction reception unit 117 updates the information stored in the site information storage unit 132, the change notification transmission unit 118 transmits a change notification indicating that the loading place P1 or the unloading place P2 has been changed to the communication terminal 20 included in the transport vehicle M2 associated with the construction site via the communication unit 14. The transport vehicle M2 that receives the change notification may be all the transport vehicles M2 associated with the construction site or may be some of the transport vehicles M2. The change notification transmission unit 118 is an example of a change notification output unit that outputs a change in work place to the communication terminal 20 included in the transport vehicle M2 associated with the construction site when receiving the input of change in the work place.

<<Communication Terminal>>

Figure 4:
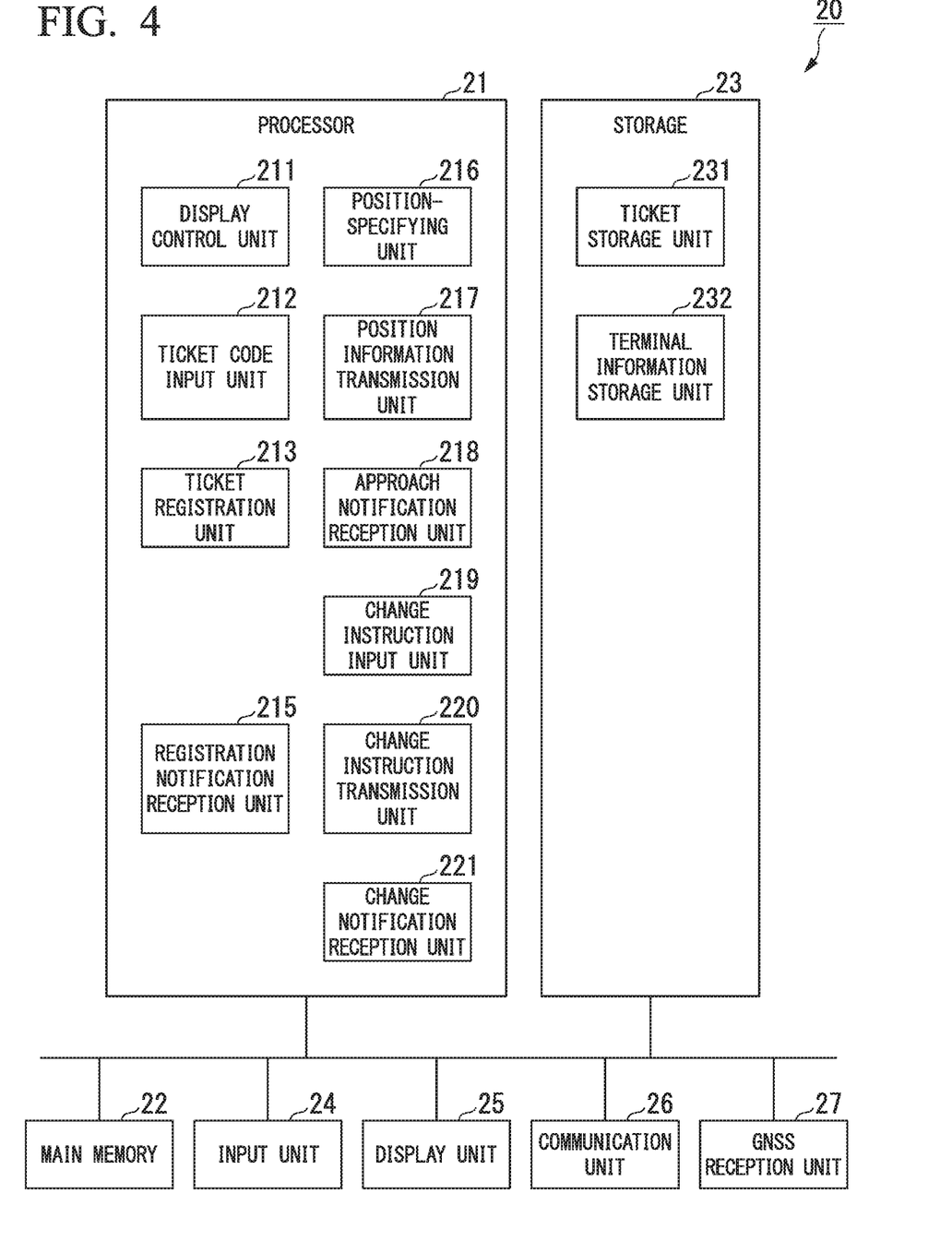
FIG. 4 is a schematic block diagram illustrating a configuration of a communication terminal according to the first embodiment.

FIG. 4 is a schematic block diagram illustrating a configuration of the communication terminal according to the first embodiment.

The communication terminal 20 includes a processor 21, a main memory 22, a storage 23, an input unit 24, a display unit 25, a communication unit 26, and a GNSS reception unit 27. The storage 23 stores a terminal side construction management program. The processor 21 reads the terminal side construction management program from the storage 23, develops terminal side construction management program in the main memory 22, and executes a process according to the terminal side construction management program. A touch panel, a keyboard, a ten key, a mouse, and the like can be used as the input unit 24. A touch panel, a liquid crystal display, an organic electroluminescence (EL) display, or the like can be used as the display unit 25. Further, a mobile phone, a smartphone, a portable computer, a monitor in a personal computer, an in-vehicle monitor, or the like may be used as the display unit 25. A network card or the like can be used as the communication unit 26. The GNSS reception unit 27 receives a GNSS signal from an artificial satellite. The received GNSS signal is used to specify the position information.

The storage 23 includes a storage area as a terminal information storage unit 232 and a ticket storage unit 231. The terminal information storage unit 232 stores a terminal ID, a user's name, a company name, and other information. The user can rewrite the user's name, company name, and other information stored in the terminal information storage unit 232. The ticket storage unit 231 stores the information on the ticket input by the user. Specifically, the ticket storage unit 231 stores the ticket code, the site ID, the type of work, and the expiration date in association with each other.

By executing the terminal side construction management program, the processor 21 functions as a display control unit 211, a ticket code input unit 212, a ticket registration unit 213, a registration notification reception unit 215, a position-specifying unit 216, a position information transmission unit 217, an approach notification reception unit 218, a change instruction input unit 219, a change instruction transmission unit 220, and a change notification reception unit 221.

The display control unit 211 generates a ticket code input screen, a map screen, an approach notification screen, a site information change screen, and a change notification screen, and displays the screen on the display unit 25. The ticket code input unit 212 receives an input of a ticket code via the input unit 24. The ticket code input unit 212 stores relevant information such as the input ticket code and the site ID in the ticket storage unit 231. The ticket code input unit 212 transmits the input ticket code together with at least the terminal ID to the server device 10 via the communication unit 26. When the registration notification reception unit 215 receives a registration notification indicating that the ticket code input to the ticket code input unit 212 can be registered, the ticket registration unit 213 stores information such as the ticket code in the ticket storage unit 231. The registration notification reception unit 215 receives a registration notification indicating whether or not the ticket code can be registered from the server device 10 via the communication unit 26. When content of the registration notification is that the ticket code has been registered, information indicating the registration is stored in the ticket storage unit 231.

The position-specifying unit 216 specifies the position of the subject device on the basis of the GNSS signal received by the GNSS reception unit 27, a wireless LAN signal, or other signals. The position information transmission unit 217 transmits the position information indicating the position specified by the position-specifying unit 216 and the terminal ID to the server device 10 via the communication unit 26. The approach notification reception unit 218 receives an approach notification indicating that the transport vehicle M2 is located within the notification area from the server device 10 via the communication unit 26.

When the type of work of the selected ticket indicates the work machine M1 or the manager M3, the change instruction input unit 219 receives an input of the change of the loading place P1 or the unloading place P2 at the construction site from the user via the input unit 24. The change instruction transmission unit 220 transmits the information input to the change instruction input unit 219 to the server device 10 via the communication unit 26. The change notification reception unit 221 receives a change notification indicating that the loading place P1 or the unloading place P2 has been changed from the server device 10 via the communication unit 26.

<<Operation>>

Here, a construction management method using the construction management system 1 according to the first embodiment will be described.

Figure 5:
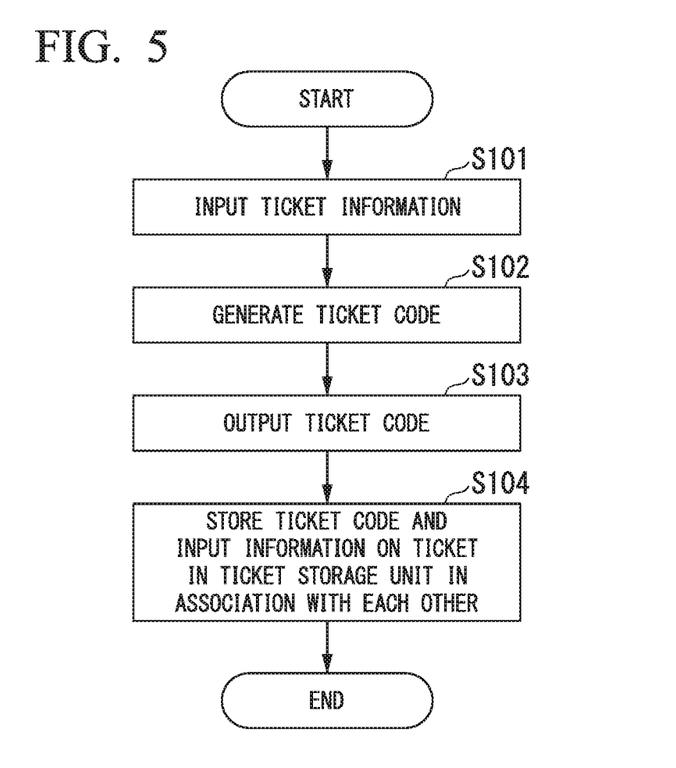
FIG. 5 is a flowchart showing a ticket issuance process in the server device according to the first embodiment.

FIG. 5 is a flowchart showing a ticket issuance process in the server device according to the first embodiment.

The server device 10 starts the ticket issuance process according to an operation of the user. For example, the server device 10 may receive a request for a ticket issuance process from the communication terminal 20-3 or the communication terminal 20-4. It should be noted that the manager M3 transmits a request for issuance of a work ticket at a stage of determining the worker of the work machine M1 and the worker of the transport vehicle M2 at the time of construction from now.

When the server device 10 starts the ticket issuance process, the ticket management unit 112 receives an input of ticket information (a site ID, a type of work, the number of tickets for each type of work, and an expiration date) from the user (Step S101). When the ticket management unit 112 receives the input of the ticket information, the ticket management unit 112 generates a ticket code by referring to the ticket code stored in the ticket storage unit 133 (Step S102). In this case, the ticket management unit 112 generates different ticket codes for each type of work.

Then, the ticket management unit 112 outputs the generated ticket code (Step S103). For example, the ticket management unit 112 transmits the ticket code to the communication terminal 20 (the communication terminal 20-3 or the communication terminal 20-4) that is a request transmission source. In this case, the ticket management unit 112 transmits the ticket code for each type of work.

Then, the ticket management unit 112 stores the ticket code generated in Step S102 and the information input in Step S101 in the ticket storage unit 133 in association with each other (Step S104). Accordingly, the server device 10 can issue a ticket indicating work information. When the ticket is issued, the manager M3 at the construction site presents a ticket code of the ticket for the work machine M1 to the worker of the work machine M1 responsible for the work at the construction site to be performed. Further, the manager M3 presents a ticket code of the ticket for the transport vehicle M2 to the worker of the transport vehicle M2 responsible for the work at the construction site to be performed. The presentation of the ticket code is performed using, for example, a method such as oral notification or e-mail presentation.

Figure 6:
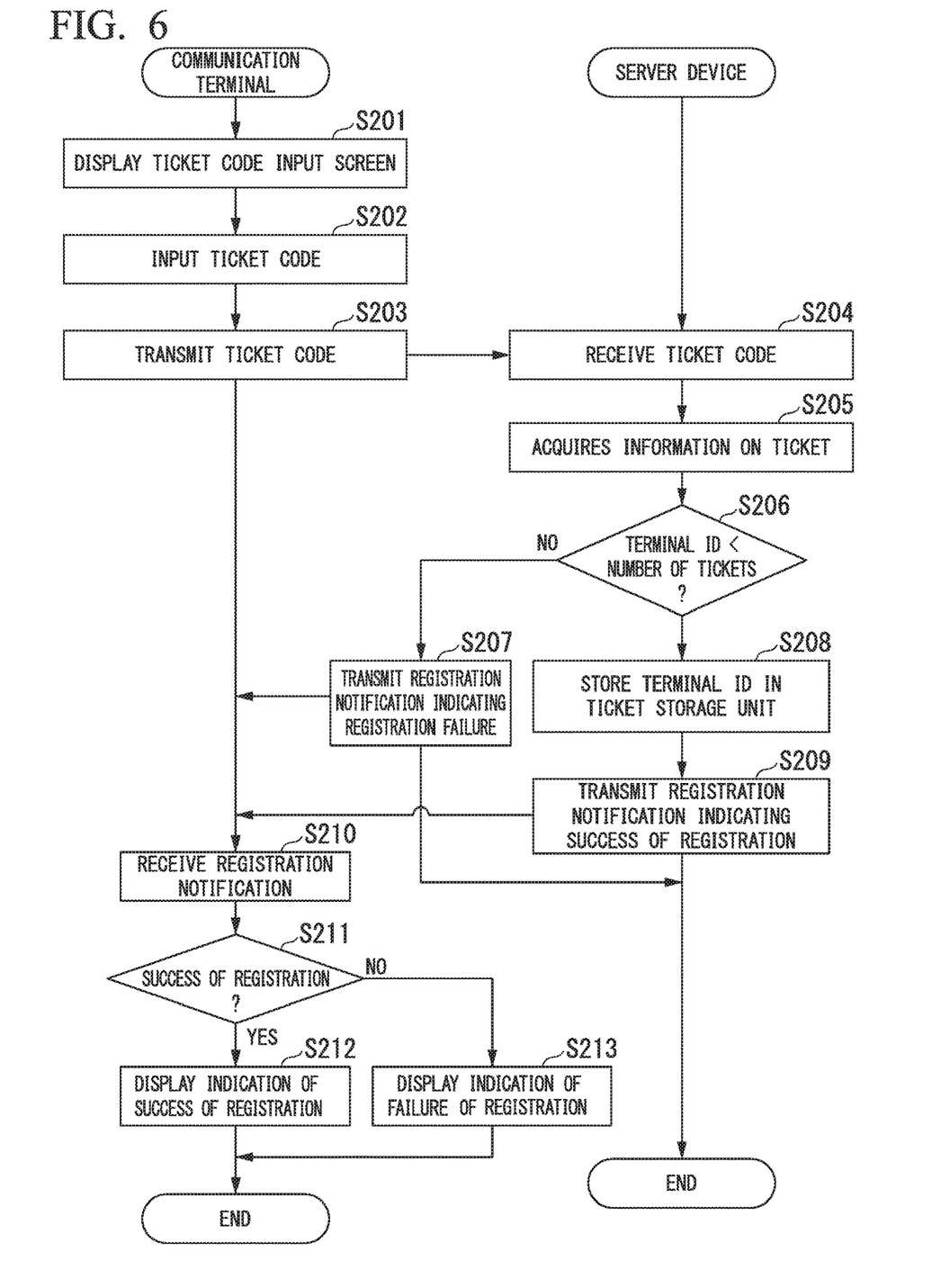
FIG. 6 is a sequence diagram illustrating a process at the time of ticket acquisition in the construction management system according to the first embodiment.

FIG. 6 is a sequence diagram illustrating a process at the time of acquisition of the ticket in the construction management system according to the first embodiment.

When the communication terminal 20 (the communication terminal 20-1 or the communication terminal 20-2) transitions to a ticket code input mode according to an operation of the worker of the work machine M1 or the transport vehicle M2, the display control unit 211 displays a ticket code input screen on the display unit 25 (Step S201). The ticket code input screen includes a text box for receiving an input of the ticket code. Then, the ticket code input unit 212 receives the input of the ticket code via the input unit 24 (Step S202). The worker inputs the ticket code presented from the manager M3 at the construction site to the communication terminal 20. When the ticket code is input, the ticket code input unit 212 transmits the input ticket code and at least the terminal ID to the server device 10 via the communication unit 26 (Step S203).

When the ticket code reception unit 113 of the server device 10 receives the ticket code from the communication terminal 20 (Step S204), the ticket management unit 112 acquires information on the ticket associated with the received ticket code (the site ID, the number of tickets, the type of work, the terminal ID, and the expiration date) from the ticket storage unit 133 (Step S205).

Then, the ticket management unit 112 determines whether or not the number of terminal IDs included in the acquired information is smaller than the number of tickets included in the information on the ticket (Step S206). When the number of terminal IDs is not smaller than the number of tickets (Step S206: NO), the registration notification transmission unit 114 transmits a registration notification indicating registration failure to the communication terminal 20 (Step S207).

On the other hand, when the number of terminal IDs is smaller than the number of tickets (Step S206: YES), the ticket management unit 112 stores the terminal ID received together with the ticket code in association with the ticket code (Step S208). The registration notification transmission unit 114 transmits a registration notification indicating the success of the registration to the communication terminal 20 (Step S209). The registration notification indicating the success of the registration includes the ticket code, the site ID, the type of work, and the expiration date.

When the registration notification reception unit 215 of the communication terminal 20 receives a registration notification from the server device 10 (Step S210), the registration notification reception unit 215 of the communication terminal 20 determines whether or not the registration notification indicates the success of the registration (Step S211). When the registration notification indicates the success of the registration (Step S211: YES), the display control unit 211 causes the display unit 25 to display the success of the registration of the ticket related to the ticket code input in Step S202 (Step S212). In addition, the ticket registration unit 213 causes the ticket storage unit 231 to store the information that the registration has been successful, which has been received in Step S210.

On the other hand, when the registration notification indicates that registration has failed (Step S211: NO), the display control unit 211 causes the display unit 25 to display that the registration of the ticket related to the ticket code input in Step S202 has failed (Step S213). Accordingly, the construction management system 1 can associate the communication terminal 20-1 and the communication terminal 20-2 with the ticket in the range of the number of tickets. That is, when the worker inputs the ticket code to the communication terminal 20-1 or the communication terminal 20-2 and when the server device 10 determines that the number of the communication terminals 20 associated with the ticket code is smaller than the number of tickets, ticket information is stored in the ticket storage unit 231 of the communication terminal 20.

Figure 7:
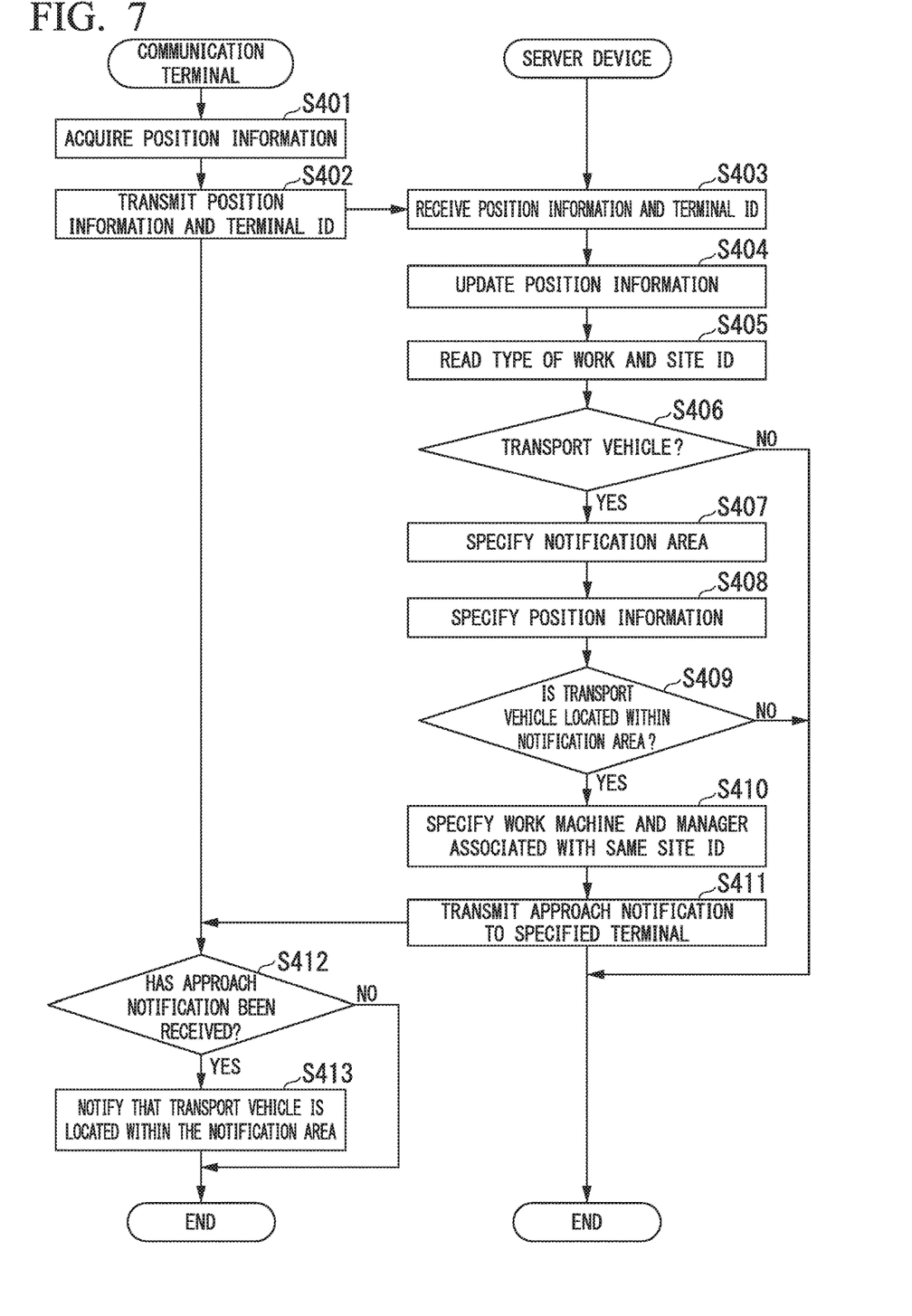
FIG. 7 is a sequence diagram illustrating a position information updating process and an approach notification process by the construction management system according to the first embodiment.

FIG. 7 is a sequence diagram illustrating a position information updating process and an approach notification process in the construction management system according to the first embodiment. When the ticket is selected by the communication terminal 20, the communication terminal 20 executes a position notification process to periodically transmit the position information and the terminal ID to the server device 10. When the communication terminal 20 starts the position notification process, the position-specifying unit 216 specifies a current position of the communication terminal 20 on the basis of, for example, the GNSS signal received by the GNSS reception unit 27 (Step S401). Then, the position information transmission unit 217 transmits position information indicating the specified current position and the terminal ID to the server device 10 (Step S402).

When the information collection unit 111 of the server device 10 receives the position information and the terminal ID from the communication terminal 20 (Step S403), the information collection unit 111 of the server device 10 updates the position information stored in association with the received terminal ID in the terminal information storage unit 131 with the received position information (Step S404). Accordingly, the position information of the communication terminal 20, that is, the position information of the work machine M1 and the transport vehicle M2 is periodically updated in the server device 10.

Accordingly, the communication terminal 20 can acquire the position information of the work machine M1 and the transport vehicle M2 working at the same work site from the server device 10, and display a map on which the positions of the work machine M1 and the transport vehicle M2 are plotted. Further, the server device 10 may generate a map image in which the position information is plotted on the map, and the communication terminal 20 may receive and display the map information.

Each time the server device 10 receives the position information from the communication terminal 20, the server device 10 executes an approach notification process of transmitting the approach notification when the transport vehicle M2 has approached the loading place P1 or the unloading place P2.

The position determination unit 115 of the server device 10 reads the type of work and the site ID associated with the terminal ID received in Step S403 from the ticket storage unit 133 (Step S405). The position determination unit 115 determines whether or not the read type of work indicates the transport vehicle M2 (Step S406). When the type of work indicates the transport vehicle M2 (Step S406: YES), the position determination unit 115 reads the loading place P1, the unloading place P2, and the notification distance L from the site information storage unit 132 on the basis of the read site ID. The position determination unit 115 specifies the notification area A on the basis of the loading place P1, unloading place P2, and the notification distance L that have been read (Step S407). Specifically, the position determination unit 115 specifies an area within the notification distance L from the loading place P1 and an area within the notification distance L from the unloading place P2 as the notification area A. That is, the position determination unit 115 is an example of a notification area-specifying unit that determines the notification area on the basis of the position of the construction site.

Then, the position determination unit 115 reads the position information from the terminal information storage unit 131 on the basis of the terminal ID received in Step S403 (Step S408). Then, the position determination unit 115 determines whether or not the position indicated by the position information read in Step S408 is within the notification area A specified in Step S406 (Step S409). That is, the position determination unit 115 determines whether or not the transport vehicle M2 is located within the notification area A.

When the position indicated by the position information is not within the notification area A (Step S409: NO), the server device 10 ends the process. On the other hand, when the position indicated by the position information is within the notification area A (Step S409: YES), the approach notification transmission unit 116 specifies the terminal ID associated with the site ID and the type of work indicating the work machine M1 or the manager M3 in the information stored in the ticket storage unit 133 on the basis of the site ID read in Step S405 (Step S410).

Then, the approach notification transmission unit 116 transmits an approach notification indicating that the transport vehicle M2 is located within the notification area A to the communication terminal 20 (the communication terminal 20-2 and the communication terminal 20-3) indicated by the specified terminal ID (Step S411). The approach notification is a push notification. That is, the operator of the work machine M1 operating at the same construction site as the transport vehicle M2 approaching the loading place P1 or the unloading place P2 and the manager M3 of the construction site is notified that the transport vehicle M2 has approached the loading place P1 or the unloading place P2. On the other hand, in Step S406, when the type of work related to the communication terminal 20 that has received the position information indicates the work machine M1 or the manager M3 (Step S406: NO), the server device 10 ends the process without transmitting the approach notification.

It should be noted that, in the present embodiment, the server device 10 performs the specifying of the notification area A, the determination as to whether or not the transport vehicle M2 is located within the notification area A, and the transmission of the approach notification, whereas in another embodiment, all or some of these processes may be performed by the communication terminal 20-1.

The approach notification reception unit 218 of the communication terminal 20 determines whether or not the approach notification has been received from the server device 10 (Step S412). When the approach notification reception unit 218 receives the approach notification (Step S412: YES), the display control unit 211 causes the display unit 25 to display an approach notification screen indicating that the transport vehicle M2 has approached the loading place P1 or the unloading place P2 (Step S413). When the approach notification reception unit 218 does not receive the approach notification (Step S412: NO), the display control unit 211 ends the process without causing the display unit 25 to display the approach notification screen. It should be noted that the communication terminal 20 according to another embodiment may display the approach notification screen on a monitor mounted on the work machine when the communication terminal 20 has received the approach notification.

Accordingly, the construction management system 1 can notify an operator of the work machine M1 and the manager M3 of the construction site that the transport vehicle M2 has approached the loading place P1 or the unloading place P2 when the transport vehicle M2 has approached the loading place P1 or the unloading place P2. Therefore, since the operator of the work machine M1 can predict a time at which the transport vehicle M2 arrives at the construction site, it is possible to prepare for loading or unloading of earth and sand before the transport vehicle M2 arrives.

Figure 8:
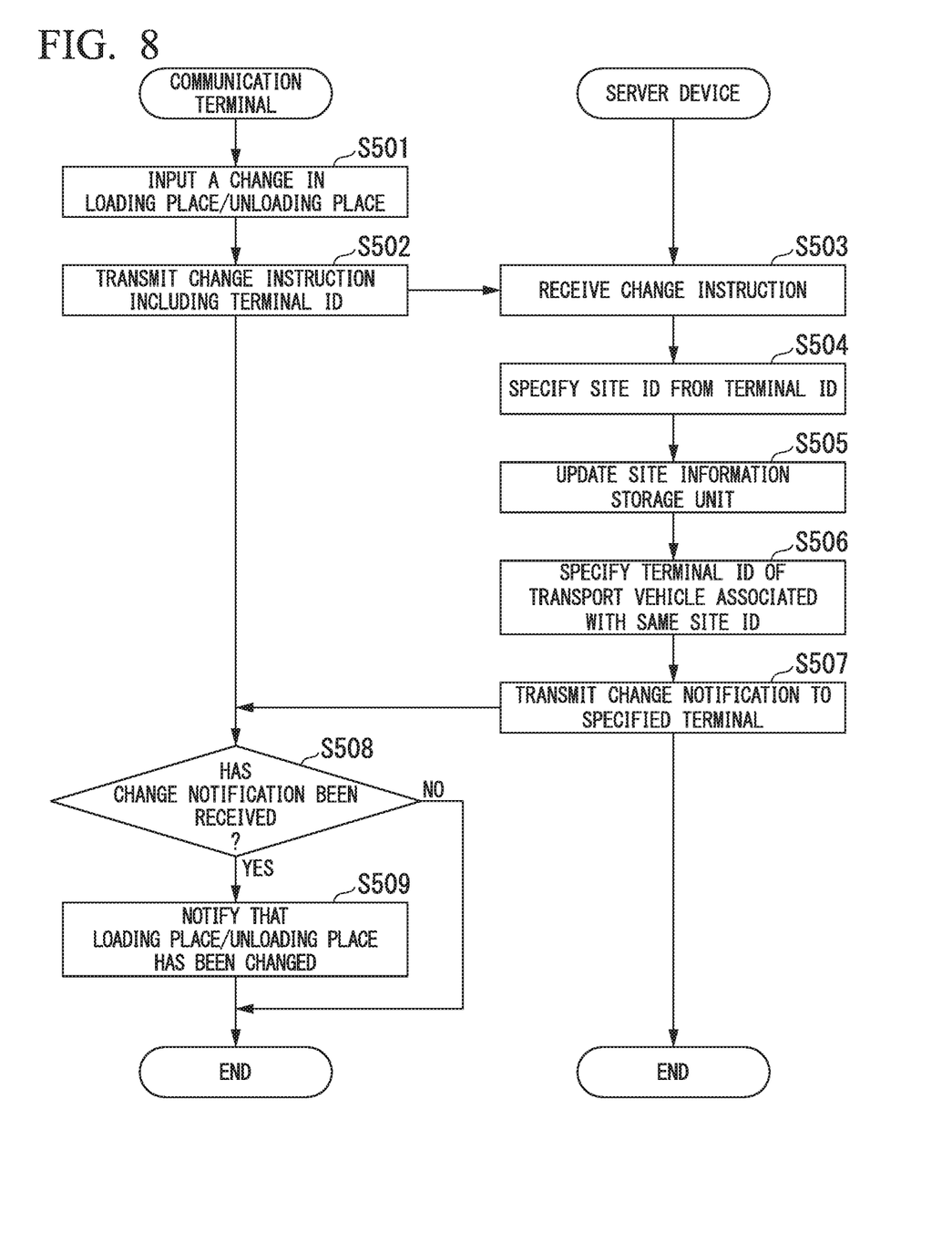
FIG. 8 is a sequence diagram illustrating a process of changing a loading place or an unloading place in the construction management system according to the first embodiment.

FIG. 8 is a sequence diagram illustrating a process of changing the loading place or the unloading place in the construction management system according to the first embodiment.

At the construction site, a place at which embankment or excavation is to be performed is often wide. Therefore, it is necessary to appropriately change the loading place P1 and the unloading place P2 of the transport vehicle M2 according to the progress of construction. When the loading place P1 and the unloading place P2 are left unchanged after the place at which the embankment or excavation is to be performed has been changed, the transport vehicle M2 moves to the loading place P1 and the loading place P2 far from the place at which the embankment or the excavation is to be performed, causing inconvenience. Therefore, in the first embodiment, the communication terminal 20-1 and the communication terminal 20-3 owned by the work machine M1 or the manager M3 can change the loading place P1 and the unloading place P2.

That is, the change instruction input unit 219 of the communication terminal 20 receives an input of the change of the loading place P1 or the unloading place P2 only when the type of work of the ticket stored in the ticket storage unit 231 indicates the work machine M1 or the manager M3.

When the change of the loading place P1 or the unloading place P2 is input to the change instruction input unit 219 (Step S501), the change instruction transmission unit 220 transmits a change instruction including the input loading place P1 or unloading place P2 after the change and the terminal ID to the server device 10 (Step S502).

When the change instruction reception unit 117 of the server device 10 receives the change instruction from the communication terminal 20 (Step S503), the change instruction reception unit 117 of the server device 10 specifies the site ID associated with the terminal ID included in the change instruction received from the ticket storage unit 133 (Step S504). Then, the change instruction reception unit 117 changes the loading place P1 and the unloading place P2 associated with the site ID specified in the site information storage unit 132, with the loading place P1 and the unloading place P2 after the change included in the change instruction (Step S505).

Then, the change notification transmission unit 118 specifies the terminal ID associated with the site ID specified in Step S504 and the type of work indicating the transport vehicle M2 in the information stored in the ticket storage unit 133 (Step S506). The change notification transmission unit 118 transmits a change notification indicating that the loading place P1 or the unloading place P2 has been changed to the communication terminal 20 (that is, the communication terminal 20-2) indicated by the specified terminal ID (Step S507). The change notification is a push notification.

The change notification reception unit 221 of the communication terminal 20 determines whether or not the change notification has been received from the server device 10 (Step S508). When the change notification reception unit 221 receives the change notification (Step S508: YES), the display control unit 211 causes the display unit 25 to display a change notification screen indicating that the loading place P1 or the unloading place P2 has been changed (Step S509). When the change notification reception unit 221 does not receive the change notification (Step S508: NO), the display control unit 211 ends the process without displaying the change notification screen on the display unit 25.

Accordingly, the construction management system 1 can notify the operator of the transport vehicle M2 that the loading place P1 or the unloading place P2 has been changed when the loading place P1 or the unloading place P2 has been changed. Therefore, it is possible to prevent the operator of the transport vehicle M2 from erroneously driving the transport vehicle M2 to the loading place P1 or the unloading place P2 before the change when the loading place P1 or the unloading place P2 has been changed.

<<Operation and Effects>>

Thus, according to the first embodiment, when the transport vehicle M2 is located within the notification area A of the construction site, the construction management system 1 outputs an indication that the transport vehicle M2 is located within the notification area A to the communication terminal 20-1 associated with the construction site. Accordingly, the operator of the work machine M1 including the communication terminal 20-1 can predict a time at which the transport vehicle M2 arrives at a predetermined place at the construction site.

In particular, in the first embodiment, the construction management system 1 outputs an indication that the transport vehicle M2 is located within the notification area A to the communication terminal 20 included in the work machine M1. Accordingly, the operator of the work machine M1 can prepare for loading or unloading before the transport vehicle M2 arrives at the loading place P1 or the unloading place P2. It should be noted that the construction management system 1 according to another embodiment may not necessarily output the approach notification to the communication terminal 20-1 included in the work machine M1. For example, the construction management system 1 according to another embodiment may output the approach notifications to the communication terminals 20-3 and 20-4 owned by the manager M3 without outputting the approach notification to the communication terminal 20-1.

Further, according to the first embodiment, the construction management system 1 issues the ticket associated with the construction site, and outputs an indication that the transport vehicle M2 is located within the notification area A to the communication terminal 20 that has acquired the ticket associated with the same construction site as the transport vehicle M2 located within the notification area. Thus, by associating the construction site with the communication terminal 20 using the ticket, the construction management system 1 can easily specify the communication terminal 20 to which the approach notification is to be transmitted.

Further, it is possible to manage workers without generating an account for login to the construction management system 1 for each worker, using the ticket. It should be noted that the construction management system 1 according to another embodiment may not necessarily associate the construction site with the communication terminal 20 using the ticket. For example, the construction management system 1 according to another embodiment may associate the construction site with the worker through login to a service using a predetermined account, and associate information on the communication terminal 20 with the account.

Further, according to the first embodiment, the type of work is set in the ticket, and the construction management system 1 determines whether or not the communication terminal 20-2 that has acquired the ticket for the transport vehicle M2 among the tickets associated with the construction site is located within the notification area A. Thus, the construction management system 1 can specify whether the communication terminal 20 is included in the transport vehicle M2 or the work machine M1 according the type of work of the ticket.

Further, according to the first embodiment, the construction management system 1 receives an input of change in the work place from the communication terminal 20-1 of the work machine M1 associated with the construction site, and notifies the communication terminal 20-2 of the transport vehicle M2 associated with the same construction site of the change in the work place. Thus, it is possible to prevent the operator of the transport vehicle M2 from driving the transport vehicle M2 to the work place before the change. It should be noted that the present invention is not limited thereto in other embodiments, and the construction management system 1 may notify the manager M3 rather than the operator of the transport vehicle M2 of the change in the work place.

Other Embodiments

Although the embodiment has been described in detail with reference to the drawings, specific configurations are not limited to those described above, and various design changes and the like can be made. For example, in the construction management system 1 according to the first embodiment, the server device 10 determines whether or not the transport vehicle M2 is located within the notification area A on the basis of the position information received from the communication terminal 20-2, but the present invention is not limited thereto.

For example, in another embodiment, the communication terminal 20-2 included in the transport vehicle M2 may include the position determination unit 115 and the approach notification transmission unit 116. In this case, the construction management system 1 operates as follows. The server device 10 notifies the communication terminal 20-2 included in the transport vehicle M2 of the loading place P1, the unloading place P2, and the notification distance L associated with the construction site in advance. When the communication terminal 20-2 has entered the notification area A, the communication terminal 20-2 transmits a notification indicating that the communication terminal 20-2 has entered the notification area to the server device 10. When the server device 10 receives the notification indicating that the communication terminal 20-2 has entered from the communication terminal 20-2, the server device 10 transmits an approach notification to the communication device 20-1 included in the work machine M1 associated with the same site as the communication terminal 20-2, or the communication terminal 20-3 and the communication terminal 20-4 owned by the manager M3. It should be noted that the communication terminal 20-2 according to another embodiment may directly transmit the approach notification to the communication terminal 20-1, the communication terminal 20-3, or the communication terminal 20-4 without passing through the server device 10.

That is, in the first embodiment, the server device 10 functions as the construction management device, whereas in other embodiments, the communication terminal 20-2 may function as the construction management device. In this case, the position-specifying unit 216 is an example of the position information acquisition unit.

Similarly, the communication terminal 20-1 included in the work machine M1 or the communication terminals 20-3 and 20-4 owned by the manager M3 includes the position information acquisition unit 111, the position determination unit 115, and the approach notification transmission unit 116 of the transport vehicle M2, and the communication terminals 20-1, 20-3, and 20-4 may function as a construction management device.

Further, the notification area A according to the first embodiment is set on the basis of the loading place P1, the unloading place P2, and the notification distance L stored in the site information storage unit 132, but the present invention is not limited thereto. For example, the notification area A according to another embodiment may be set according to a communication coverage of the wireless communication device. Specifically, in another embodiment, when a communication coverage of an access point of a wireless LAN is set as the notification area A and the communication terminal 20 of the transport vehicle M2 becomes communicable with the access point, or when radio wave intensity becomes equal to or higher than a predetermined value, the approach notification may be transmitted. Examples of wireless communication include Wi-Fi (registered trademark), Bluetooth (registered trademark), and a radio-frequency identification (RFID).

In addition, in the construction management system 1 according to the first embodiment, when the loading place P1 or the unloading place P2 is changed, a change notification screen is displayed on the display unit 25 of the communication terminal 20, but the present invention is not limited thereto. For example, the communication terminal 20 according to another embodiment may draw the map as illustrated in FIG. 2, and changes and draws the position of the loading place P1 or the unloading place P2 to the loading place P1 or the unloading place P2 after the change when the communication terminal 20 receives the change notification.

For example, in another embodiment, the communication terminal 20-1 included in the transport vehicle M21 includes the site information storage unit 132 that stores a work place (the loading place P1 or the unloading place P2) at the construction site, the change instruction reception unit 117 that receives an instruction to change the work place from the operator of the work machine M1, and the change notification transmission unit 118 that transmits an instruction to change the work place to the server device 10, the communication terminal 20-2 included in the transport vehicle M2, or the communication terminal 20-3 and the communication terminal 20-4 owned by the manager M3. That is, in the first embodiment, the server device 10 functions as the construction management device, whereas in another embodiment, the communication terminal 20-1 may function as the construction management device. In this case, the change instruction input unit 219 is an example of a change reception unit, and the change instruction transmission unit 220 is an example of a change notification output unit.

Similarly, the communication terminal 20-2 included in the transport vehicle M2 or the communication terminal 20-3 and the communication terminal 20-4 owned by the manager M3 may include the site information storage unit 132, the change instruction reception unit 117, and the change notification transmission unit 118. The communication terminal 20-2, the communication terminal 20-3, and the communication terminal 20-4 may function as a construction management device.

Further, the construction management system 1 according to the first embodiment automatically generates the ticket code when issuing the ticket, but the present invention is not limited thereto. For example, the construction management system 1 according to another embodiment may receive an input of the ticket code from the user.

INDUSTRIAL APPLICABILITY

According to at least one of the above aspects, a construction management system and a construction management method capable of notifying a work machine that a transport vehicle has approached a predetermined place at a construction site are provided.

REFERENCE SIGNS LIST

1 Construction management system
10 Server device
131 Terminal information storage unit
132 Site information storage unit
133 Ticket storage unit
111 Information collection unit
112 Ticket management unit
113 Ticket code reception unit
114 Registration notification transmission unit
115 Position determination unit
116 Approach notification transmission unit
117 Change instruction reception unit
118 Change notification transmission unit
20 Communication terminal
231 Ticket storage unit
232 Terminal information storage unit
20 Communication terminal
211 Display control unit
212 Ticket code input unit
213 Ticket registration unit
215 Registration notification reception unit
216 Position-specifying unit
217 Position information transmission unit
218 Approach notification reception unit
219 Change instruction input unit
220 Change instruction transmission unit
221 Change notification reception unit

The invention claimed is:

1. A construction management method implemented by or performed under control of one or more processors, the method comprising:
issuing a ticket including information of a work type that identifies a target of the ticket as being one of a work machine and a transport vehicle, the ticket including a first ticket for a transport vehicle acquired by a first communication terminal provided in the transport vehicle and a second ticket for a work machine acquired by a second communication terminal provided in the work machine,
registering the transport vehicle, which acquired the first ticket, as a transport vehicle with the first communication terminal in the transport vehicle,
registering the work machine, which acquired the second ticket, as a work machine with the second communication terminal in the work machine,
acquiring position information transmitted from a communication terminal including a detected position,
setting a notification area in a construction site, the notification area being specified as an area within a predetermined distance from a work place including a loading place at which work of loading is performed or an unloading place at which work of unloading is performed,
determining whether or not the detected position of the registered transport vehicle is positioned within the notification area, and
outputting, when the detected position of the registered transport vehicle is determined as being positioned within the notification area, an approaching notification of the registered transport vehicle indicating the registered transport vehicle being within the notification area to the second communication terminal of the registered work machine, the second communication terminal being provided in the registered work machine that works in cooperation with the registered transport vehicle at the work place.

2. The construction management method according to claim 1, wherein the acquired position information further includes the identifier of the communication terminal, the one or more processors determining whether the communication terminal is associated with a transport vehicle by comparing the identifier from the acquired position information with identifiers of communication terminals of registered transport vehicles.

3. The construction management method according to claim 1, further comprising:
receiving, from the first communication terminal, information including a ticket code associated with the first ticket and the identifier of the first communication terminal,
wherein, in response to receipt of the information from the first communication terminal, the transport vehicle, which acquired the first ticket, is registered as a transport vehicle with the first communication terminal in the transport vehicle.

4. The construction management method according to claim 2, further comprising:
receiving, from the second communication terminal, information including a ticket code associated with the second ticket and the identifier of the second communication terminal,
wherein, in response to receipt of the information from the second communication terminal, the work machine, which acquired the second ticket, is registered as a work machine with the second communication terminal in the work machine.

5. The construction management method according to claim 1, wherein the one or more processors output the approaching notification of the registered transport vehicle of a ticketed group to the registered work machine within the same ticketed group.

6. A construction management system comprising:
one or more processors; and
a main memory being accessible to the one or more processors,
wherein one or more processors are configured to
issue a ticket including information of a work type that identifies a target of the ticket as being one of a work machine and a transport vehicle, the ticket including a first ticket for a transport vehicle acquired by a first communication terminal provided in the transport vehicle and a second ticket for a work machine acquired by a second communication terminal provided in the work machine, register the transport vehicle, which acquired the first ticket, as a transport vehicle with the first communication terminal in the transport vehicle, register the work machine, which acquired the second ticket, as a work machine with the second communication terminal in the work machine, acquire position information transmitted from a communication terminal including a detected position, set a notification area in a construction site, the notification area being specified as an area within a predetermined distance from a work place including a loading place at which work of loading is performed or an unloading place at which work of unloading is performed, determine whether or not the detected position of the registered transport vehicle is positioned within the notification area, and output, when the detected position of the registered transport vehicle is determined as being positioned within the notification area, an approaching notification of the registered transport vehicle indicating the registered transport vehicle being within the notification area to the second communication terminal of the registered work machine, the second communication terminal being provided in the registered work machine that works in cooperation with the registered transport vehicle at the work place.

7. The construction management system according to claim 6,
wherein the one or more processors are further configured to receive an input of a change in the work place at the construction site from the registered work machine via the second communication terminal, the change in the work place to the second communication terminal included in the transport vehicle upon receiving the input of the change in the work place.

8. The construction management system according to claim 6,
wherein the transport vehicle comprises a dump truck, and the work machine comprises a loader, hydraulic excavator or a bulldozer.

9. The construction management system according to claim 6,
wherein the one or more processors are further configured to:
receive, via a communication unit, an input of information on a construction including a site identifier and a type of work, and of a ticket issuance request including a number of tickets and an expiration date, from a user;
generate a ticket with a ticket code and issue, via the communication unit, the ticket code;
receive, via the communication unit, a ticket code and a number of communication terminal identifiers for a transport vehicle, work machine or manager; and
register the terminal identifiers as part of the group associated with the ticket if the number of terminal identifiers is smaller than the number of tickets for the ticket.

10. The construction management system according to claim 6,
wherein the notification area comprises an area within the notification distance, from the loading place or the unloading place, which is stored in the main memory.

11. The construction management system according to claim 6, wherein the acquired position information further includes the identifier of the communication terminal, the one or more processors determining whether the communication terminal is associated with a transport vehicle by comparing the identifier from the acquired position information with identifiers of communication terminals of registered transport vehicles.

12. The construction management system according to claim 6, wherein the one or more processors are further configured to:
receive from the first communication terminal information including a ticket code associated with the first ticket and the identifier of the first communication terminal,
wherein, in response to receipt of the information from the first communication terminal, the one or more processors register the transport vehicle, which acquired the first ticket, as a transport vehicle with the first communication terminal in the transport vehicle.

13. The construction management system according to claim 12, wherein the one or more processors are further configured to:
receive from the second communication terminal information including a ticket code associated with the second ticket and the identifier of the second communication terminal,
wherein, in response to receipt of the information from the second communication terminal, the one or more processors register the work machine, which acquired the second ticket, as a work machine with the second communication terminal in the work machine.

14. The construction management system according to claim 6, wherein the one or more processors output the approaching notification of the registered transport vehicle of a ticketed group to the registered work machine within the same ticketed group.

* * * * *